US012066114B2

(12) United States Patent
Krishnan et al.

(10) Patent No.: US 12,066,114 B2
(45) Date of Patent: Aug. 20, 2024

(54) SYSTEMS AND METHODS FOR PURGING LIQUID FROM A LIQUID FUEL SUPPLY SYSTEM

(71) Applicant: GENERAL ELECTRIC COMPANY, Schenectady, NY (US)

(72) Inventors: Jeevankumar Krishnan, Karnataka (IN); Laxmikant Merchant, Karnataka (IN); Anil Kumar Dasoji, Karnataka (IN); Rajarshi Saha, Karnataka (IN)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 122 days.

(21) Appl. No.: 17/532,280

(22) Filed: Nov. 22, 2021

(65) Prior Publication Data

US 2023/0160479 A1 May 25, 2023

(51) Int. Cl.

| | |
|---|---|
| ***F16K 11/07*** | (2006.01) |
| ***F02C 7/22*** | (2006.01) |
| ***F02C 7/232*** | (2006.01) |
| ***F16K 24/02*** | (2006.01) |
| ***F16K 31/122*** | (2006.01) |

(52) U.S. Cl.

CPC ................ *F16K 11/07* (2013.01); *F02C 7/22* (2013.01); *F02C 7/232* (2013.01); *F16K 24/02* (2013.01); *F16K 31/1221* (2013.01)

(58) Field of Classification Search

CPC ...... F16K 11/07; F16K 31/1221; F16K 24/02; F02C 7/232; F23R 3/286; F23R 2990/00004

USPC ........................................................ 60/39.094

See application file for complete search history.

(56) References Cited

U.S. PATENT DOCUMENTS

| | | | | |
|---|---|---|---|---|
| 5,261,340 | A * | 11/1993 | Conley, Jr. | D05B 39/00 112/470.14 |
| 5,263,312 | A * | 11/1993 | Walker | F16L 19/005 60/797 |
| 6,050,081 | A | 4/2000 | Jansen et al. | |
| 2005/0097880 | A1 * | 5/2005 | Jansen | F02M 37/18 60/39.281 |
| 2005/0160716 | A1 * | 7/2005 | Jansen | F02C 7/232 60/39.094 |
| 2016/0195020 | A1 * | 7/2016 | Bernard | F23K 5/04 60/776 |
| 2019/0003265 | A1 * | 1/2019 | McLaughlin | F16L 15/08 |
| 2019/0137104 | A1 * | 5/2019 | Jain | F02C 7/222 |

* cited by examiner

*Primary Examiner* — Kelsey E Cary

(74) *Attorney, Agent, or Firm* — Armstrong Teasdale LLP

(57) ABSTRACT

A three-way valve for a liquid fuel supply system includes a housing defining a liquid fuel inlet, a purge gas inlet, and at least one drain port. The liquid fuel inlet is sized to receive liquid fuel therethrough for selectively channeling the liquid fuel to a combustor of a gas turbine engine. The purge gas inlet is sized to receive purge gas therethrough for selectively purging liquid fuel from said three-way valve. The at least one drain port is oriented to selectively channel liquid fuel from said three-way valve when purge gas is purging liquid fuel from said three-way valve.

17 Claims, 5 Drawing Sheets

SYSTEMS AND METHODS FOR PURGING LIQUID FROM A LIQUID FUEL SUPPLY SYSTEM

BACKGROUND

The embodiments described herein relate generally to a liquid fuel supply system for a gas turbine engine and, more particularly, to a three-way valve used to purge liquid from a liquid fuel supply system.

Land-based, heavy-duty gas turbine engines are commonly used to generate electricity. At least some known gas turbine engines operate using a gaseous fuel and a liquid fuel. For example, at least some known gas turbine engines may use the liquid fuel when the gaseous fuel is unavailable or is undesirable. Moreover, when the gas turbine engine is operating on the gaseous fuel, the parallel liquid fuel supply system may store a portion of the liquid fuel in the fuel lines, for example, in standby mode. Although the liquid fuel may be drained from areas of the system near the combustors, because of the geometry and configuration of equipment within the system, some residual liquid fuel may still remain in those areas of the liquid fuel supply system that were drained.

With at least some known gas turbine engines, combustion of the gaseous fuel increases the operating temperatures in the combustors and in areas adjacent to the combustors, including portions of the liquid fuel supply system. The increased operating temperature of the portion of the liquid fuel supply system adjacent to the combustors may cause oxidation and/or partial decomposition of the residual liquid fuel in the liquid fuel supply system, thereby producing coke in the fuel lines and/or valves in a process known as "coking." Over time, continued coking may create hard deposits being formed in the liquid fuel supply system. Such deposits may clog and/or foul the associated fuel lines and valves and/or may interfere with the transfer of liquid fuel through the liquid fuel supply system. Depending on the severity of the coking, the gas turbine engine may be required to shut down for maintenance.

To facilitate preventing fuel from becoming stagnant and thus susceptible to coking, at least some known gas turbine engines circulate purge gas through the liquid fuel supply system. For example, at least some known systems purge the liquid fuel lines with a gas, such as nitrogen, to enable the remaining liquid fuel and/or gas to be drained from the liquid fuel supply system. Despite purging the liquid fuel supply system, some residual liquid fuel may remain in the liquid fuel system because of its geometry and configuration. For example, because of the alignment of some valves and/or fittings, cavities may be formed within the liquid fuel supply system can contain residual liquid fuel and thus may be susceptible to coking.

BRIEF DESCRIPTION

In one aspect, a three-way valve for a liquid fuel supply system is provided. The three-way valve includes a housing defining a liquid fuel inlet, a purge gas inlet, and at least one drain port. The liquid fuel inlet is sized to receive liquid fuel therethrough for selectively channeling the liquid fuel to a combustor of a gas turbine engine. The purge gas inlet is sized to receive purge gas therethrough for selectively purging liquid fuel from the three-way valve. The at least one drain port is oriented to selectively channel liquid fuel from the three-way valve when purge gas is purging liquid fuel from the three-way valve.

In another aspect, a liquid fuel supply system is provided. The liquid fuel supply system includes a three-way valve including a housing defining a liquid fuel inlet and a purge gas inlet. The liquid fuel inlet is sized to receive liquid fuel therethrough for selectively channeling the liquid fuel to a combustor of a gas turbine engine. The purge gas inlet is sized to receive purge gas therethrough for selectively purging liquid fuel from the three-way valve. The purge gas inlet includes a purge gas port and a purge gas channel. The purge gas channel defines a purge gas channel diameter. The liquid fuel supply system also includes a fitting sized to be inserted into the purge gas inlet and oriented to channel purge gas into the purge gas inlet. The fitting defines a fitting conduit defining a fitting conduit diameter. The fitting conduit diameter is equal to the purge gas channel diameter.

In yet another aspect, a method of selectively purging liquid fuel from a liquid fuel supply system is provided. The liquid fuel supply system includes a three-way valve and a fitting. The method includes inserting the fitting into a purge gas inlet of the three-way valve. The three-way valve includes a housing including a liquid fuel inlet, the purge gas inlet, at least one drain port, and an outlet. The method also includes channeling liquid fuel into the liquid fuel inlet and through a housing of the three-way valve to the outlet. The method further includes stopping the flow of liquid fuel through the three-way valve. The method also includes channeling purge gas from the fitting into the purge gas inlet and through the housing to the outlet. The method further includes draining liquid fuel from the purge gas chamber through the at least one drain port.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
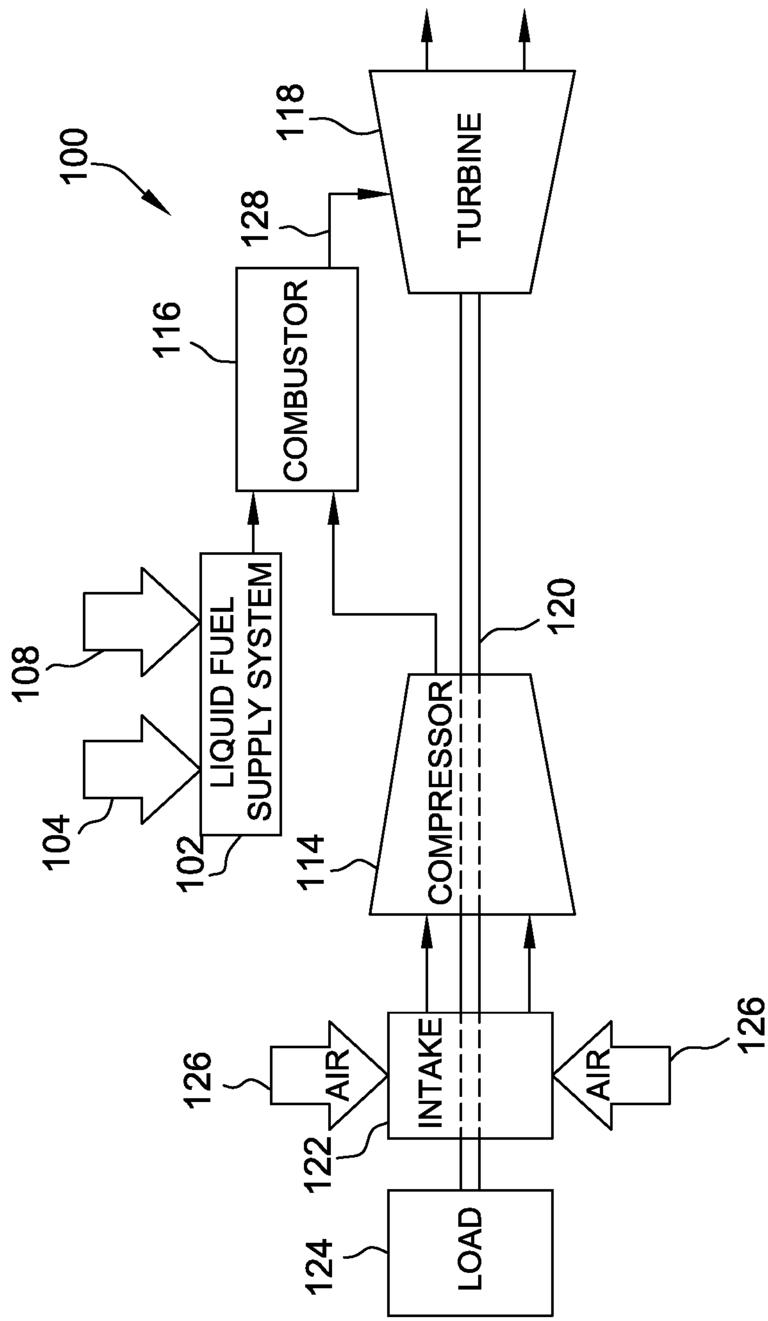
FIG. 1 is a schematic diagram of an exemplary dual-fuel turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The exemplary components and methods described herein overcome at least some of the disadvantages associated with known liquid fuel supply systems for land-based, power-generating gas turbine engines and, in particular, gaseous fuel/liquid fuel turbine engines ("dual-fuel turbine engines"). The exemplary embodiments described herein include a three-way valve and a fitting for inhibiting the formation of coke deposits in the liquid fuel supply systems for the dual-fuel turbine engines.

The three-way valve includes a liquid fuel inlet, a purge gas inlet, and an outlet. The fitting is coupled to the purge gas inlet to enable purge gas to be channeled into the three-way valve to remove residual liquid fuel from the three-way valve when the gas turbine engine is operating on gaseous fuel or is being maintained. As described herein, the three-way valve includes one or more drain ports that facilitate inhibiting coke formation in the liquid fuel supply system. Specifically, the drain port(s) are positioned to enable residual liquid fuel to be drained from the three-way valve. Additionally, the fitting is sized and shaped to correspond to the purge gas inlet such that any dead space between the fitting and the purge gas inlet is minimized, thus reducing an amount of residual liquid fuel that could accumulate in the dead space and facilitating reducing coking within the dead space. Accordingly, the three-way valves and fittings described herein facilitate inhibiting coke formation in the liquid fuel supply system.

FIG. 1 is a schematic diagram of an exemplary dual-fuel turbine engine 100, such as a land-based turbine engine used to generate electricity. In the exemplary embodiment, turbine engine 100 uses a liquid fuel, such as heavy fuel oil, kerosene, naphtha, condensates, and/or any other suitable liquid fuel, or a gaseous fuel, such as natural gas, to operate. Turbine engine 100 includes a liquid fuel supply system 102 that supplies liquid fuel 104 to turbine engine 100 from a fuel source 106 (shown in FIG. 2). In some embodiments, one or more fuel nozzles (not shown) in a combustor 116 of turbine engine 100 may receive liquid fuel 104 and one or more other fuel nozzles may receive a gaseous fuel (not shown).

In the exemplary embodiment, liquid fuel supply system 102 also receives a purge gas 108 from a purge gas system 110 (shown in FIG. 2), for example, when turbine engine 100 is not operating on liquid fuel 104. As used herein, "purge gas" 108 may include nitrogen, air or "instrument air," such as supply of air that is purified or otherwise substantially excludes contaminants, and/or any other suitable gas, such as any gas (which may be pressurized) that does not pose a risk of auto-ignition and/or is otherwise inert and/or purified, as described herein. Purge gas 108 may be used and/or available from a purge gas source 112 (shown in FIG. 2) available, for example, in a power plant associated with turbine engine 100. For example, and without limitation, purge gas 108 is channeled to turbine engine 100 to facilitate inhibiting and/or reducing coking of liquid fuel 104. In some embodiments, purge gas 108 may be heated to any suitable temperature, such as to within a range of a combustion temperature of gaseous fuel and/or liquid fuel, and/or any other suitable temperature. In alternate embodiments, purge gas 108 may be cooler than a combustion temperature, such as less than a combustion temperature by a predetermined amount.

In the exemplary embodiment, turbine engine 100 combusts liquid fuel 104 to produce power and purges a portion of turbine engine 100 with purge gas 108 after combustion is complete. Purging turbine engine 100 with purge gas 108 facilitates reducing coking within the fuel lines and/or valves. Residual liquid fuel 104 may remain in turbine engine 100 after combustion is complete, and purge gas 108 enables the residual liquid fuel 104 to be removed from turbine engine 100, thus facilitating reducing coking within the fuel lines and/or valves. Specifically, a three-way valve 140 (FIG. 2) within liquid fuel supply system 102 receives purge gas 108 from purge gas system 110 to enable the residual liquid fuel 104 to be purged from turbine engine 100 to facilitate reducing coking within the fuels line and/or valves.

In the exemplary embodiment, turbine engine 100 also includes a compressor 114, combustor 116, a turbine 118, a shaft 120, an air intake 122, and a load 124. Compressor 114, turbine 118, and load 124 are rotatably coupled to each other via shaft 120. Air intake 122, compressor 114, combustor 116, and turbine 118 are arranged in a serial configuration such that combustion air 126 is channeled from air intake 122 to turbine 118. Additionally, liquid fuel supply system 102, combustor 116, and turbine 118 are also arranged in a serial configuration such that liquid fuel 104 and/or purge gas 108 are channeled from liquid fuel supply system 102 to turbine 118. Liquid fuel supply system 102 channels liquid fuel 104 into combustor 116, and combustor 116 combusts combustion air 126 with liquid fuel 104 to generate combustion gases 128 that are channeled to turbine 118.

During operation, air intake 122 draws combustion air 126 into compressor 114, and compressor 114 compresses combustion air 126 and channels combustion air 126 into combustor 116. Liquid fuel supply system 102 channels liquid fuel 104 into combustor 116, and combustor 116 combusts combustion air 126 with liquid fuel 104 to generate combustion gases 128. Combustion gases 128 are channeled to turbine 118 to cause turbine 118 to rotate. Turbine 118 rotates shaft 120, which rotates compressor 114 to facilitate compressing combustion air 126 and rotating load 124 to facilitate generating power.

Residual liquid fuel 104 may remain in turbine engine 100 after turbine engine 100 is no longer combusting or operating with liquid fuel 104 to produce power. During such operational times, residual heat within turbine engine 100 may cause coking of the residual liquid fuel 104. Coking can negatively impact the operation of turbine engine 100. For example, coking can reduce the flow area of liquid fuel lines. In addition, coke deposits can harden over time and cause one or more valves in liquid fuel supply system 102 to seize. Moreover, deposit fragments can flake off the fuel line surfaces, flow through open valves, and choke the fuel nozzles in combustor 116. As such, coking can lead to uneven distribution of liquid fuel 104 in combustor 116, which may result in tripping of turbine engine 100.

Purge gas system 110 facilitates inhibiting coking within turbine engine 100 by channeling purge gas 108 through portions of turbine engine 100 to facilitate removing residual liquid fuel 104 prior to coking of the liquid fuel 104. As such, purge gas system 110 facilitates improving the reliability and efficiency of turbine engine 100. In addition, the operating and maintenance costs of turbine engine 100 are facilitated to be reduced.

Figure 2:
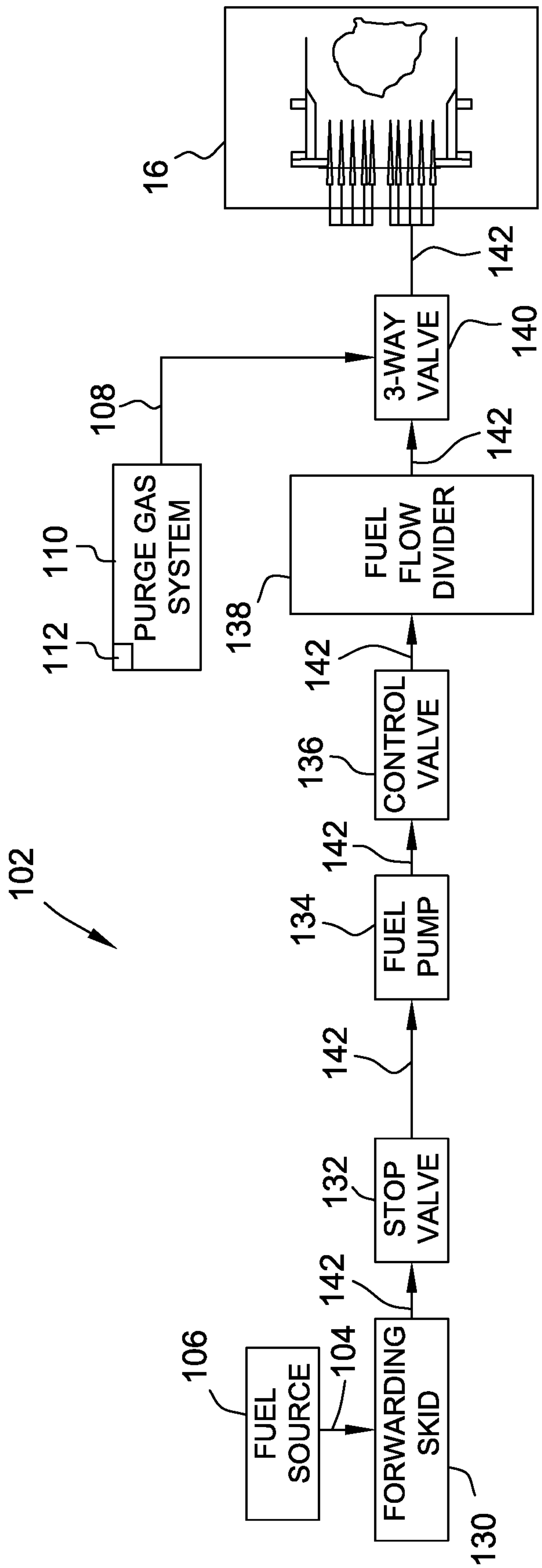
FIG. 2 is a schematic diagram of a liquid fuel supply system that may be used with the turbine engine shown in FIG. 1.

FIG. 2 is a schematic diagram of liquid fuel supply system 102 for use with turbine engine 100 (shown in FIG. 1). In the exemplary embodiment, liquid fuel supply system 102 includes purge gas system 110 coupled in fluid communication with liquid fuel supply system 102. Liquid fuel supply system 102 also includes a liquid fuel forwarding skid 130, a stop valve 132, a liquid fuel pump 134, a control valve 136, a fuel flow divider 138, and a three-way valve 140. Liquid fuel 104 flows into liquid fuel supply system 102 from liquid fuel forwarding skid 130.

During liquid fuel operation of turbine engine 100, stop valve 132, between forwarding skid 130 and liquid fuel pump 134, is opened, and liquid fuel 104 is channeled to liquid fuel pump 134. Liquid fuel pump 134 generates a positive fuel flow through control valve 136 and into fuel flow divider 138. In the exemplary embodiment, liquid fuel pump 134 includes, for example, and without limitation, a positive displacement pump, a centrifugal pump, and/or any other fluid moving device that enables liquid fuel supply system 102 to function as described herein.

In the exemplary embodiment, fuel flow divider 138 divides liquid fuel 104 into a number of fuel streams equal to the number of fuel nozzles for each combustor 116 (only one of which is shown in FIG. 2). When turbine engine 100 is operating on gaseous fuel, portions of liquid fuel supply system 102 may remain charged with liquid fuel 104 while portions of liquid fuel supply system 102 are purged with purge gas 108 to facilitate purging liquid fuel 104 from at least some portions of liquid fuel supply system 102, thus reducing coking within portions of liquid fuel supply system 102. For example, components of liquid fuel supply system 102 may remain idle while both control valve 136 and stop valve 132 remain in a closed position.

In at least some embodiments, instrument air actuates three-way valve 140 associated with each combustor 116 to facilitate preventing liquid fuel 104 from entering each respective combustor 116. Purge gas 108 is then channeled into three-way valve 140, such as continuously and/or in pulses or bursts, to facilitate purging liquid fuel 104 from three-way valve 140 to facilitate reducing coking within three-way valve 140. In the exemplary embodiment, control valve 136 regulates (i.e., permits, prevents, and/or controls) the flow of liquid fuel 104 into three-way valve 140. More specifically, control valve 136 facilitates controlling an amount and/or rate at which liquid fuel 104 flows into three-way valve 140, thereby facilitating metering the flow rate into combustor 116. Stop valve 132 and control valve 136 may include, for example, and without limitation, a proportional valve, a solenoid valve, a servo valve, and/or any other type of fluid flow control valve that enables liquid fuel supply system 102 to function as described herein.

During gaseous fuel operations or maintenance of turbine engine 100, liquid fuel 104 is pressurized up to three-way valve 140. Liquid fuel lines 142 downstream from three-way valve 140 are purged with purge gas 108 to cause purge gas 108 to displace liquid fuel 104 in liquid fuel lines 142. In some embodiments, liquid fuel 104 in liquid fuel supply system 102 can remain stagnant for long periods, for example, and without limitation, in some instances up to approximately six months or longer. During this stagnant period, a temperature of liquid fuel 104 in liquid fuel supply system 102 may reach or exceed temperatures of at least 350° Fahrenheit (° F.) (177 degrees Celsius (° C.)) due to its proximity to combustor 116. The combination of the increased temperature and stagnation period can lead to the formation of coke deposits, for example, in three-way valve 140 and liquid fuel lines 142 of liquid fuel supply system 102. Moreover, liquid fuel 104 residue can exist on the inner surfaces of liquid fuel lines 142 after purge operations. Purge gas 108 can enter liquid fuel lines 142 through three-way valve 140 and prevent residual liquid fuel 104 from remaining in contact with the hot metal surfaces of the liquid fuel lines 142, where coking may occur.

In the exemplary embodiment, purge gas system 110 is coupled in fluid communication with liquid fuel supply system 102, to enable purge gas 108 (shown in FIG. 1) to be channeled into liquid fuel supply system 102 to facilitate inhibiting coking in liquid fuel supply system 102. Purge gas system 110 includes purge gas source 112 that contains purge gas 108. Purge gas source 112 can have any size and/or shape that that enables a desired amount of purge gas 108 to be contained or produced.

Typically, it is more economical to operate turbine engine 100 on gaseous fuel. However, when operating on gaseous fuel, liquid fuel 104 may remain stagnant for extended periods in liquid fuel supply system 102, as described herein. Activating purge gas system 110 enables purge gas 108 to be channeled through three-way valve 140 to facilitate inhibiting and/or reducing coking in liquid fuel supply system 102. For example, when purge gas system 110 is activated, as described herein, purge gas 108 forces the removal of liquid fuel 104 from portions of liquid fuel supply system 102 and turbine engine 100, such as prior to and/or during operation using gaseous fuel. For example, immediately prior to, or simultaneously with, the transition to gaseous fuel operation, control valve 136 is closed, and purge gas system 110 is activated to purge liquid fuel lines 142. Turbine engine 100 thus transitions from liquid fuel 104 operation to gaseous fuel operation.

Figure 3:
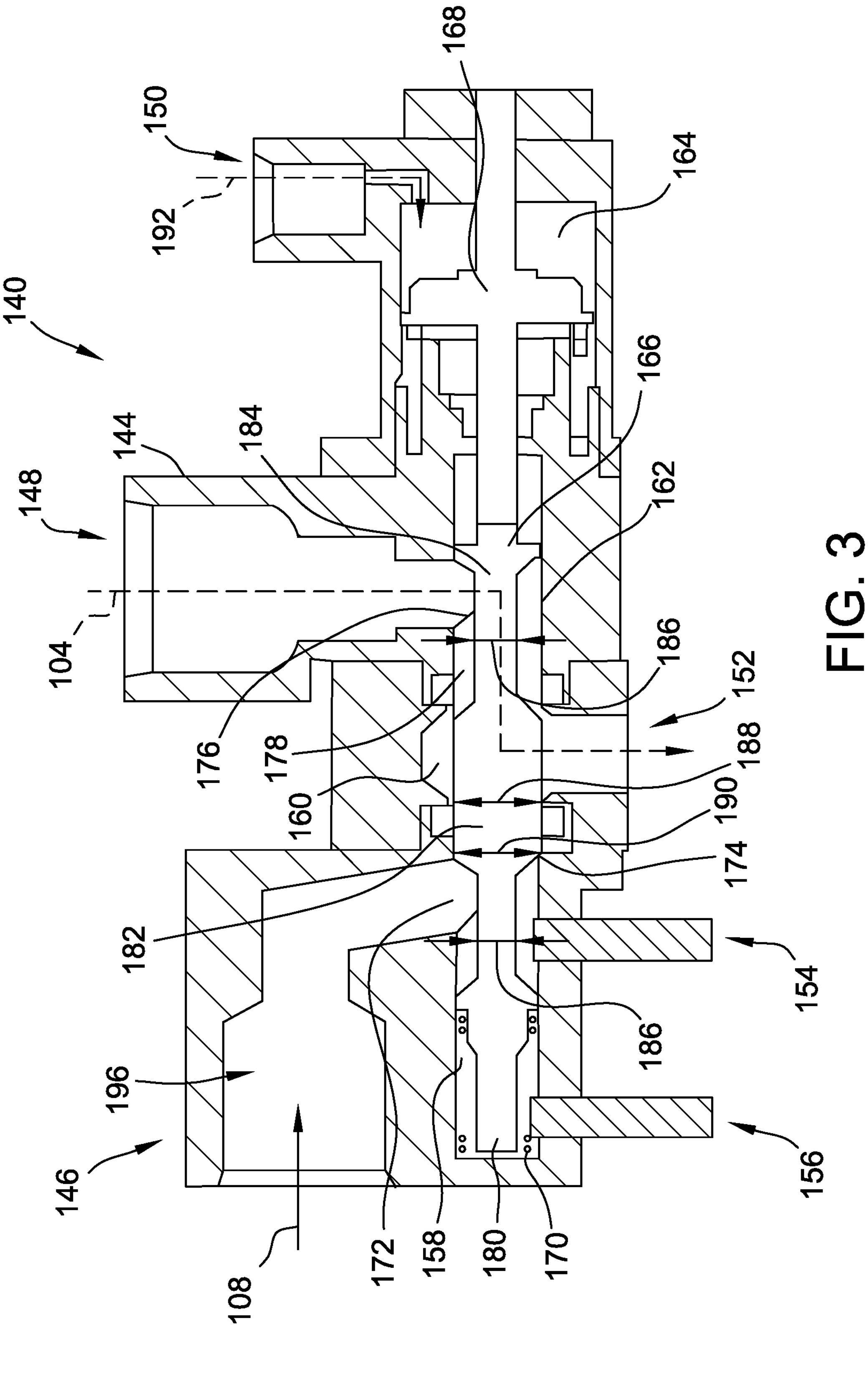
FIG. 3 is a schematic cross-sectional diagram of an exemplary three-way valve that may be used with the liquid fuel supply system shown in FIG. 2.

FIG. 3 is a cross-sectional schematic diagram of an exemplary three-way valve 140. In the exemplary embodiment, three-way valve 140 includes a housing 144 that includes a purge gas inlet 146, a liquid fuel inlet 148, an actuator air inlet 150, an outlet 152, at least one drain port 154, 156, a purge gas chamber 158, an intermediate chamber 160, a liquid fuel chamber 162, and an actuator air chamber 164. Three-way valve 140 also includes a spool 166 positioned within purge gas chamber 158, intermediate chamber 160, and liquid fuel chamber 162, a piston 168 positioned within liquid fuel chamber 162 and actuator air chamber 164 and coupled to spool 166, and a spring 170 that circumscribes a portion of spool 166 within purge gas chamber 158.

In the exemplary embodiment, purge gas chamber 158 includes a purge gas chamber inlet 172 coupled in flow communication with purge gas inlet 146 and a purge gas chamber outlet 174 coupled in flow communication with intermediate chamber 160. Purge gas chamber 158 is also coupled in flow communication with drain ports 154 and 156 to enable draining residual liquid fuel 104 from three-way valve 140. In the exemplary embodiment, three-way valve 140 includes a first drain port 154 and a second drain port 156. In alternative embodiments, three-way valve 140 may include any other number of drain ports 154 and/or 156 that enables three-way valve 140 to operate as described herein including, without limitation, less than two drain ports, or three or more drain ports.

Additionally, in alternative embodiments, drain ports 154 and 156 may be coupled in flow communication with intermediate chamber 160, liquid fuel chamber 162, and/or actuator air chamber 164. Liquid fuel chamber 162 includes a liquid fuel chamber inlet 176 coupled in flow communication with liquid fuel inlet 148 and a liquid fuel chamber outlet 178 coupled in flow communication with intermediate chamber 160. Actuator air chamber 164 is coupled in flow communication with actuator air inlet 150. Intermediate chamber 160 is coupled in flow communication with purge gas inlet 146 via purge gas chamber outlet 174 and with liquid fuel chamber 162 via liquid fuel chamber outlet 178. Additionally, intermediate chamber 160 is also coupled in flow communication with outlet 152 to facilitate discharging liquid fuel 104 and/or purge gas 108 from three-way valve 140.

In the exemplary embodiment, spool 166 is sized and shaped to facilitate switching between liquid fuel 104 and purge gas 108. Specifically, in the exemplary embodiment, spool 166 includes a purge gas section 180, an intermediate section 182, and a liquid fuel section 184. As shown in FIG. 3, purge gas section 180 and liquid fuel section 184 are each formed with a first diameter 186, and intermediate section 182 is formed with a second diameter 188 that is larger than first diameter 186. Second diameter 188 is selected to enable intermediate section 182 to facilitate preventing the flow of either liquid fuel 104 through liquid fuel chamber outlet 178 or purge gas 108 through purge gas chamber outlet 174, during operation of three-way valve 140.

Specifically, in the exemplary embodiment, second diameter 188 is approximately equal to an intermediate chamber diameter 190 such that intermediate section 182 facilitates preventing the flow of either liquid fuel 104 through liquid fuel chamber outlet 178, or purge gas 108 through purge gas chamber outlet 174, during operation of three-way valve 140. Purge gas section 180 is sized and shaped to enable spring 170 to circumscribe a portion of purge gas section 180 to cause spool 166 to be biased away from purge gas chamber 158. Liquid fuel section 184 is sized and shaped to enable interfacing with piston 168 to cause spool 166 to actuate towards purge gas chamber 158.

During operation, actuator air 192 is channeled into actuator air chamber 164, actuating piston 168 and spool 166 into the position shown in FIG. 3. Specifically, actuator air 192 causes piston 168 and spool 166 to transition towards purge gas chamber 158 such that intermediate section 182 substantially prevents the flow of purge gas 108 through purge gas chamber outlet 174, while enabling the flow of liquid fuel 104 through liquid fuel chamber outlet 178. Liquid fuel 104 is channeled into and through liquid fuel inlet 148, liquid fuel chamber 162, intermediate chamber 160, and outlet 152. Liquid fuel 104 is then channeled into combustor 116 for combustion, as described above.

When turbine engine 100 is operating on gaseous fuel, actuator air 192 is not channeled into actuator air chamber 164 and spring 170 biases piston 168 and spool 166 away from purge gas chamber 158 and towards liquid fuel chamber 162. Specifically, spring 170 biases piston 168 and spool 166 towards liquid fuel chamber 162 such that intermediate section 182 prevents the flow of liquid fuel 104 through liquid fuel chamber outlet 178, while enabling the flow of purge gas 108 through purge gas chamber outlet 174. Purge gas 108 is channeled into and through purge gas inlet 146, purge gas chamber 158, intermediate chamber 160, and outlet 152 to purge residual liquid fuel 104 from three-way valve 140.

Additionally, in at least some embodiments, one or more drain ports 154 and/or 156 may be opened to drain residual liquid fuel 104 from purge gas chamber 158, such as during and/or following receipt of purge gas 108 within purge gas chamber 158. For example, in at least some embodiments, one or more drain ports 154 and/or 156 may be initially closed when purge gas 108 is received within purge gas chamber 158, and subsequently opened, such as in response to halting receipt of purge gas 108 and/or as purge gas 108 continues to flow into purge gas chamber 158. Moreover, in some embodiments, purge gas 108 may be pulsed (e.g., supplied in bursts or discontinuous streams) through purge gas inlet 146 to facilitate purging residual liquid fuel 104.

Without such purging, residual liquid fuel 104 may remain in three-way valve 140 after three-way valve 140 is no longer channeling liquid fuel 104, and operational or residual heat within turbine engine 100 may cause coking of the residual liquid fuel 104 during operation or after shutdown of turbine engine 100. As described above, coke deposits can negatively impact the operation of turbine engine 100. For example, deposit fragments can flake off of surfaces within three-way valve 140, flow through outlet 152, and choke the fuel nozzles in combustor 116. As such, coke deposits may lead to uneven distribution of liquid fuel 104 in combustor 116, which, depending on the severity of the uneven distribution, can result in tripping, i.e., an immediate ceased operation, of turbine engine 100. Purge gas 108 thus facilitates inhibiting the formation of coke deposits within three-way valve 140 by channeling purge gas 108 through three-way valve 140 to facilitate removing residual liquid fuel 104 from purge gas chamber 158 and, in at least some embodiments, to force residual liquid fuel 104 to drain through drain ports 154 and/or 156.

For example, as described herein, in at least some embodiments, purge gas 108 may be supplied in pulses or bursts through regions of three-way valve 140, such as through purge gas chamber 158, while drain ports 154 and/or 156 remain closed. Pulsed bursts of purge gas 108 within three-way valve 140 may help to clear regions of three-way valve 140, such as purge gas chamber 158, of residual liquid fuel 104 and/or accumulated coke. Subsequently, drain ports 154 and/or 156 may be opened to release residual liquid fuel 104, which may in some cases also contain coke and/or other debris dislodged during the pulsed purge cycle. In addition, in at least some embodiments, maintaining drain ports 154 and/or 156 in a closed position during introduction of purge gas 108 may enhance the removal of coke and other debris, for example, as a result of the fact that purge gas 108 may be introduced at high velocity, high temperature, and/or high pressure and may be contained or recirculated within portions of three-way valve 140 prior to opening drain ports 154 and/or 156.

As a result of such purging, three-way valve 140 facilitates improving the reliability and efficiency of turbine engine 100. In addition, the operating and maintenance costs of turbine engine 100 may be reduced, such as by reducing or eliminating the presence of residual liquid fuel 104 and/or accumulated coke and by, correspondingly, improving the longevity of one or more components.

Figure 4:
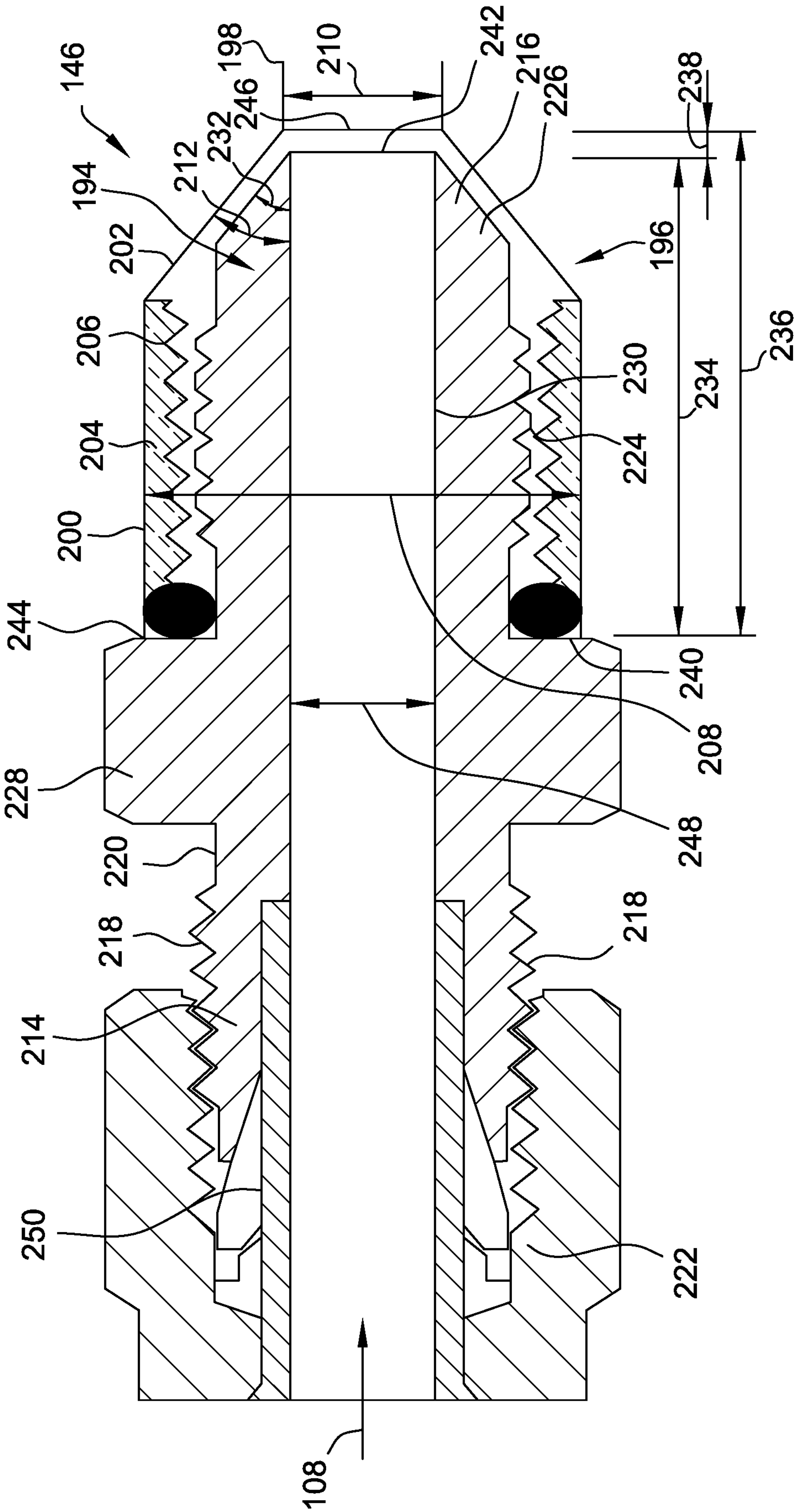
FIG. 4 is a schematic cross-sectional diagram of an exemplary fitting positioned within a purge gas inlet of the three-way valve shown in FIG. 3.

In some embodiments, purge gas system 110 also includes a fitting 194 that enables purge gas 108 from purge gas system 110 to be directed to purge gas inlet 146 to facilitate inhibiting the formation of coke deposits within purge gas inlet 146 and three-way valve 140. FIG. 4 is a cross-sectional schematic diagram of an exemplary fitting 194 inserted into an exemplary purge gas inlet 146. Purge gas inlet 146 includes a purge gas port 196 and a purge gas channel 198 coupled in flow communication with purge gas port 196 and purge gas chamber inlet 172. In the exemplary embodiment, purge gas channel 198 may define a smooth interior surface that is substantially free of steps and/or other abrupt changes in diameter, at least within an inflow portion 250 thereof, if not over the entire length of purge gas channel 198 within fitting 194. In some embodiments, the smooth interior surface of purge gas channel 198 further inhibits the accumulation of liquid fuel 104 residue and/or coke, for example, as a result of the smooth or step-less interior surface, which is substantially free of crevices and other regions within which liquid fuel 104 may collect.

Moreover, in the exemplary embodiment, purge gas port 196 includes a threaded section 200 and a beveled section 202. Threaded section 200 includes threads 204 formed on an inner surface 206 of threaded section 200 to enable connection to fitting 194. Purge gas channel 198 has a purge gas channel diameter 210 that is smaller than a diameter 208 of threaded section 200. Beveled section 202 is coupled to threaded section 200 such that purge gas channel 198 is aligned at a first bevel angle 212 of between about 30° to about 40°. More specifically, first bevel angle 212 may be between about 35° to about 40° or about 37°. Beveled section 202 transitions from the diameter 208 of threaded section 200 to the diameter 210 of purge gas channel 198.

As shown in FIG. 4, fitting 194 includes a hose or pipe connection 214 and a port connection 216. Hose or pipe connection 214 includes threads 218 formed on an outer surface 220 to enable coupling to a hose or to pipe 222. Port connection 216 includes a head 228, a connection threaded section 224 extending axially from the head 228, and a beveled tip 226 extending from the connected threaded section 224. A fitting conduit 230 extends through hose or pipe connection 214 and through port connection 216 to enable purge gas 108 to be channeled from hose or pipe 222 into purge gas channel 198. During operation, hose or pipe connection 214 is coupled to hose or pipe 222, and port connection 216 is coupled to purge gas inlet 146 such that purge gas 108 is channeled from hose or pipe 222 into purge gas channel 198 and into three-way valve 140. Specifically, hose or pipe connection 214 is coupled to hose or pipe 222 by rotating threading 218 of hose or pipe connection 214 into hose or pipe 222, and port connection 216 is coupled to purge gas inlet 146 by rotating connection threaded section 224 into threaded section 200.

The size and shape of connection threaded section 224, beveled tip 226, and head 228 facilitates eliminating or reducing the formation of coke deposits in purge gas inlet 146. Specifically, connection threaded section 224, beveled tip 226, and head 228 are sized and shaped to complement threaded section 200 and beveled section 202 such that the formation of coke deposits is eliminated or reduced in purge gas inlet 146. For example, as shown in FIG. 4, connection threaded section 224, beveled tip 226, head 228, threaded section 200, and beveled section 202 are sized and shaped to minimize dead space between fitting 194 and purge gas inlet 146. Minimizing the dead space between fitting 194 and purge gas inlet 146 reduces the spaces where residual liquid fuel 104 can accumulate and form coke deposits. Thus, connection threaded section 224, beveled tip 226, and head 228 enable eliminating or reducing the formation of coke deposits in purge gas inlet 146.

Further, as shown in FIG. 4, connection threaded section 224, beveled tip 226, and head 228 are sized and shaped to enable connection threaded section 224, beveled tip 226, and head 228 to comply with specific engineering tolerances within purge gas inlet 146. For example, a second bevel angle 232 of beveled tip 226 substantially corresponds to first bevel angle 212 of beveled section 202. In the exemplary embodiment, second bevel angle 232 may be between about 35° to about 40° or about 37°. Moreover, in various embodiments, second bevel angle 232 is substantially equal to first bevel angle 212. Likewise, in at least some embodiments, second bevel angle 232 is substantially equal to first bevel angle 212 plus or minus a threshold value, such as plus or minus any desired engineering tolerance (e.g., plus or minus a tolerance in the range of 0.001° to 5.0°). Additionally, a fitting length 234 of threaded section 224 and beveled tip 226 substantially corresponds to an inlet length 236 to enable a gap 238 between beveled tip 226 and purge gas channel 198 to be maintained within a predetermined engineering tolerance. In the exemplary embodiment, fitting length 234 is defined as the length from an edge 240 of head 228 to an end 242 of beveled tip 226, and inlet length 236 is defined as the length from an inlet 244 of purge gas port 196 to an inlet 246 of purge gas channel 198. In the exemplary embodiment, fitting length 234 substantially corresponds to inlet length 236 to enable gap 238 to be maintained within the predetermined engineering tolerance, which may be any suitable tolerance, such as, but not limited to, less than or equal to about 2 mm.

Maintaining gap 238 within the predetermined engineering tolerance enables the reduction of the dead space between fitting 194 and purge gas inlet 146, which in turn enables the reduction or inhibition of disruptions to the flow of purge gas 108 within fitting 194 and purge gas inlet 146, the accumulation of residual liquid fuel 104 between fitting 194 and purge gas inlet 146, and coking in the dead space between fitting 194 and purge gas inlet 146. Specifically, fitting conduit 230 has a fitting conduit diameter 248 substantially equal to purge gas channel diameter 210, and maintaining gap 238 within the predetermined engineering tolerance enables a smooth transition from fitting conduit 230 to purge gas channel 198 to be formed.

Discontinuities within a flow path may cause recirculation and/or chaotic flow patterns with the flow path. For example, if gap 238 is greater than the predetermined engineering tolerance, dead space may be formed between fitting 194 and purge gas inlet 146, and purge gas 108 may recirculate within purge gas inlet 146. The recirculating purge gas 108 may enable residual liquid fuel 104 to be deposited within the dead space, and such residual liquid fuel 104 may form coke deposits as described herein.

Conversely, maintaining gap 238 within the predetermined engineering tolerance enables formation of a smooth transition from fitting conduit 230 to purge gas channel 198, enables reduction of recirculation of purge gas 108 within purge gas inlet 146, enables reduction and/or elimination of residual liquid fuel 104 within purge gas inlet 146, and enables reduction and/or elimination of coking within purge gas inlet 146. Accordingly, connection threaded section 224, beveled tip 226, and head 228 are sized and shaped to enable connection threaded section 224, beveled tip 226, and head 228 to comply with specific engineering tolerances within purge gas inlet 146 to enable gap 238 to be maintained within the predetermined engineering tolerance, thereby reducing or eliminating the formation of coke deposits within purge gas inlet 146.

Figure 5:
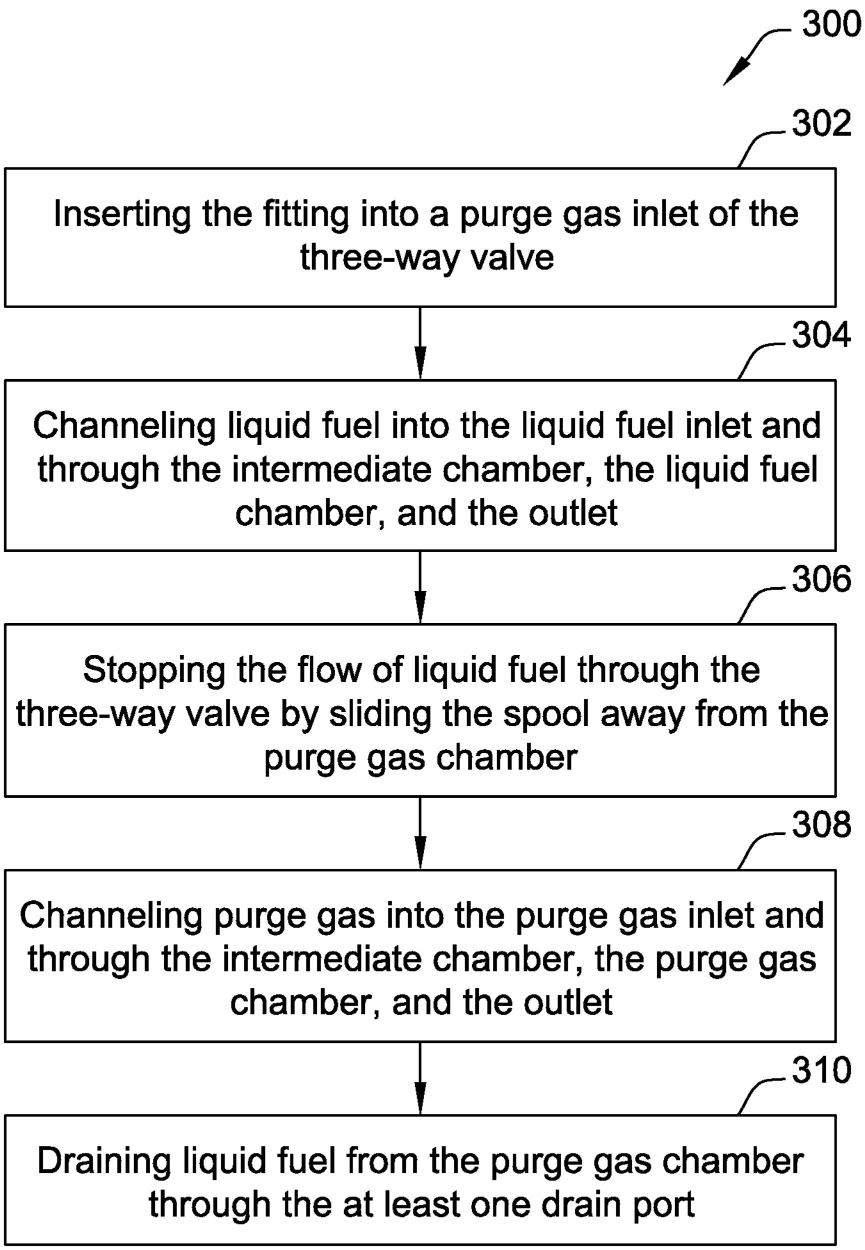
FIG. 5 is a block diagram of an exemplary method of purging the three-way valve shown in FIG. 3.

FIG. 5 is a block diagram of a method 300 of purging liquid fuel 104 from a liquid fuel supply system 102. The method 300 includes inserting 302 the fitting 194 into a purge gas inlet 146 of the three-way valve 140. The three-way valve 140 includes a spool 166 and a housing 144 including a liquid fuel inlet 148, the purge gas inlet 146, at least one drain port 154 and/or 156, an outlet 152, a purge gas chamber 158, an intermediate chamber 160, and a liquid fuel chamber 162. The spool 166 is positioned within the purge gas chamber 158, the intermediate chamber 160, and the liquid fuel chamber 162. The method 300 also includes channeling 304 liquid fuel 104 into the liquid fuel inlet 148 and through the intermediate chamber 160, the liquid fuel chamber 162, and the outlet 152. The method 300 further includes stopping 306 the flow of liquid fuel 104 through the three-way valve 140 by sliding the spool 166 away from the purge gas chamber 158. The method 300 also includes channeling 308 purge gas 108 into the purge gas inlet 146 and through the intermediate chamber 160, the purge gas chamber 158, and the outlet 152. The method 300 further includes draining 310 liquid fuel 104 from the purge gas chamber 158 through the at least one drain port 154 and/or 156.

Exemplary embodiments of a three-way valve and a fitting for inhibiting the formation of coke deposits in a liquid fuel supply system of a dual-fuel turbine engine are thus described herein. The three-way valve includes a liquid fuel inlet, a purge gas inlet, and an outlet. The fitting is coupled to the purge gas inlet to enable purge gas to be channeled into the three-way valve to remove residual liquid fuel from the three-way valve. As described herein, the three-way valve includes one or more drain ports that, in conjunction with circulation of the purge gas, facilitate inhibiting coke formation in the liquid fuel supply system. Specifically, the drains port(s) are positioned to enable residual liquid fuel to be drained from the three-way valve. Additionally, the fitting is sized and shaped to correspond to the purge gas inlet such that any dead space between the fitting and the purge gas inlet is minimized, thus reducing an amount of residual liquid fuel that could accumulate in the dead space and facilitating reducing coking within the dead space. Accordingly, the three-way valves and fittings described herein facilitate inhibiting coke formation in the liquid fuel supply system.

Further aspects of the present disclosure are provided by the subject matter of the following clauses:

1. A three-way valve for a liquid fuel supply system, said three-way valve including a housing defining: a liquid fuel inlet sized to receive liquid fuel therethrough for selectively channeling the liquid fuel to a combustor of a gas turbine engine, a purge gas inlet sized to receive purge gas therethrough for selectively purging liquid fuel from said three-way valve, and at least one drain port oriented to selectively channel liquid fuel from said three-way valve in response to liquid fuel being purged from at least a portion of said three-way valve.

2. The three-way valve of any preceding clause, wherein said housing further defines a purge gas chamber coupled in flow communication with said purge gas inlet, wherein said at least one drain port is coupled in flow communication with said purge gas chamber and is oriented to selectively channel the liquid fuel from said purge gas chamber when the purge gas is received through said purge gas inlet.

3. The three-way valve of any preceding clause, further comprising a plurality of drain ports.

4. The three-way valve of any preceding clause, wherein said housing further defines: a liquid fuel chamber coupled in flow communication with said liquid fuel inlet, an intermediate chamber coupled in flow communication with said liquid fuel chamber and said purge gas chamber, an outlet coupled in flow communication with said intermediate chamber, wherein purge gas is channeled from said purge gas inlet into and through said purge gas chamber, said intermediate chamber, and said outlet.

5. The three-way valve of any preceding clause, wherein the liquid fuel is channeled from said liquid fuel inlet into and through said liquid fuel chamber, said intermediate chamber, and said outlet.

6. The three-way valve of any preceding clause, further comprising a spool positioned within said purge gas chamber, said intermediate chamber, and said liquid fuel chamber, wherein said spool is oriented to prevent liquid fuel flow into said intermediate chamber when the purge gas is purging the liquid fuel from said three-way valve.

7. The three-way valve of any preceding clause, wherein said spool is oriented to prevent purge gas flow into said intermediate chamber when said three-way valve is channeling the liquid fuel.

8. The three-way valve of any preceding clause, further comprising a spring circumscribing said spool and oriented to bias said spool away from said purge gas chamber.

9. A liquid fuel supply system comprising: a three-way valve comprising a housing defining: a liquid fuel inlet sized to receive liquid fuel therethrough for selectively channeling the liquid fuel to a combustor of a gas turbine engine; and a purge gas inlet sized to receive purge gas therethrough for selectively purging the liquid fuel from said three-way valve, said purge gas inlet includes a purge gas port and a purge gas channel, said purge gas channel defines a purge gas channel diameter; and a fitting sized to be inserted into said purge gas inlet and oriented to channel the purge gas into said purge gas inlet, said fitting defining a fitting conduit defining a fitting conduit diameter, wherein said fitting conduit diameter is equal to said purge gas channel diameter.

10. The system of any preceding clause, wherein said fitting includes a connection threaded section, a beveled tip including an end, and a head including an edge, said fitting defines a fitting length from said edge of said head to said end of said beveled tip.

11. The system of any preceding clause, wherein said purge gas port includes a port inlet and said purge gas channel defines a channel inlet, wherein said purge gas port defines an inlet length from said port inlet to said channel inlet.

12. The system of any preceding clause, wherein said end of said beveled tip and said purge gas inlet define a gap therebetween, and wherein said fitting length and said inlet length are sized such that said gap is less than or equal to a predetermined engineering tolerance.

13. The system of any preceding clause, wherein said purge gas port includes a threaded section and a beveled section defining a first bevel angle, and wherein said beveled tip defines a second bevel angle equal to said first bevel angle.

14. The system of any preceding clause, wherein said second bevel angle is equal to said first bevel angle plus or minus a threshold value.

15. The system of any preceding clause, wherein said first bevel angle is in a range of 30° to 40° and said second bevel angle is in a range of 30° to 40°.

16. The system of any preceding clause, wherein said housing further defines at least one drain port oriented to channel liquid fuel out of said three-way valve in response to the purge gas purging the liquid fuel from said three-way valve.

17. The system of any preceding clause, wherein said housing further defines a purge gas chamber coupled in flow communication with said purge gas inlet, wherein said at least one drain port is coupled in flow communication with said purge gas chamber and is oriented to channel the liquid fuel out of said purge gas chamber when the purge gas is received through said purge gas inlet.

18. The system of any preceding clause, said housing further defines a plurality of drain ports oriented to channel the liquid fuel out of said three-way valve.

19. The system of any preceding clause, wherein said housing defines a liquid fuel chamber coupled in flow communication with said liquid fuel inlet; an intermediate chamber coupled in flow communication with said liquid fuel chamber and a purge gas chamber; and an outlet coupled in flow communication with said intermediate chamber, wherein the purge gas is channeled from said purge gas inlet into and through said purge gas chamber, said intermediate chamber, and said outlet.

20. A method of selectively purging liquid fuel from a liquid fuel supply system, the liquid fuel supply system including a three-way valve and a fitting, said method comprising: inserting the fitting into a purge gas inlet of the three-way valve, the three-way valve including a housing including a liquid fuel inlet, the purge gas inlet, at least one drain port, and an outlet; channeling liquid fuel into the liquid fuel inlet and through a housing of the three-way valve to the outlet; stopping a flow of liquid fuel through the three-way valve; channeling purge gas from the fitting into the purge gas inlet and through the housing of the three-way valve to the outlet; and draining liquid fuel from the purge gas chamber through the at least one drain port.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the scope of the disclosure. For example, components of each system and/or steps of each method may be used and/or practiced independently and separately from other components and/or steps described herein. Additionally, while various embodiments of the disclosure have been described, it is to be understood that aspects of the disclosure may include only some of the described embodiments, and that each component and/or step may also be used and/or practiced with other systems and methods. Accordingly, the disclosure is not to be seen as limited by the foregoing description, but is only limited by the scope of the appended claims.

Although specific features of various embodiments of the disclosure may be shown in some drawings and not in others, this is for convenience only. Moreover, references to “one embodiment” or “an embodiment” in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A three-way valve for a liquid fuel supply system, said three-way valve comprising:
- a housing having a first end and an opposite second end that is spaced axially from the first end, said housing defining:
  - a liquid fuel inlet sized to receive liquid fuel therethrough for selectively channeling the liquid fuel through a liquid fuel outlet to a combustor of a gas turbine engine;
  - a purge gas inlet sized to receive purge gas therethrough for selectively purging the liquid fuel from said three-way valve when a flow of the liquid fuel is prevented into said three-way valve;
  - at least one outlet oriented to selectively discharge the liquid fuel from said three-way valve from a first axial location in response to the liquid fuel being purged from at least a portion of said three-way valve; and
  - at least two drain ports spaced axially apart and oriented to selectively channel the liquid fuel from said three-way valve in response to the liquid fuel being purged from at least a portion of said three-way valve, wherein each of said at least two drain ports are spaced an axial distance from said at least one outlet.

2. The three-way valve in accordance with claim 1, wherein said housing further defines a purge gas chamber coupled in flow communication with said purge gas inlet, wherein said at least two drain ports are each coupled in flow communication with said purge gas chamber and are oriented to selectively channel the liquid fuel from said purge gas chamber when the purge gas is received through said purge gas inlet.

3. The three-way valve in accordance with claim 2, wherein said housing further defines:
- a liquid fuel chamber coupled in flow communication with said liquid fuel inlet; and
- an intermediate chamber coupled in flow communication with said liquid fuel chamber and said purge gas chamber
- wherein said at least one outlet is coupled in flow communication with said intermediate chamber, wherein the purge gas is channeled from said purge gas inlet into said purge gas chamber, said intermediate chamber, and said at least one outlet.

4. The three-way valve in accordance with claim 3, wherein the liquid fuel is channeled from said liquid fuel inlet into said liquid fuel chamber, said intermediate chamber, and said at least one outlet.

5. The three-way valve in accordance with claim 3 further comprising a spool positioned within said purge gas chamber, said intermediate chamber, and said liquid fuel chamber, wherein said spool is oriented to prevent the liquid fuel flow into said intermediate chamber when the purge gas is purging the liquid fuel from said three-way valve.

6. The three-way valve in accordance with claim 5, wherein said spool is oriented to prevent purge gas flow into said intermediate chamber when said three-way valve is channeling the liquid fuel.

7. The three-way valve in accordance with claim 5 further comprising a spring circumscribing said spool and oriented to bias said spool away from said purge gas chamber.

8. A liquid fuel supply system comprising:
a three-way valve comprising a housing defining:
a liquid fuel inlet sized to receive liquid fuel therethrough for selectively channeling the liquid fuel through a liquid fuel outlet to a combustor of a gas turbine engine; and
a purge gas inlet sized to receive purge gas therethrough for selectively purging the liquid fuel from said three-way valve when a flow of the liquid fuel is prevented into said three-way valve, said purge gas inlet includes a purge gas port and a purge gas channel, said purge gas channel defines a purge gas channel diameter;
at least one outlet;
at least two drain ports spaced axially apart from one another and spaced axially from said at least one outlet, wherein said at least one outlet and said at least two drain ports are each oriented to selectively discharge the liquid fuel from said three-way valve in response to the liquid fuel being purged from at least a portion of said three-way valve; and
a fitting sized to be inserted into said purge gas inlet and oriented to channel the purge gas into said purge gas inlet, said fitting defining a fitting conduit defining a fitting conduit diameter, wherein said fitting conduit diameter is equal to said purge gas channel diameter.

9. The liquid fuel supply system in accordance with claim 8, wherein said fitting includes a connection threaded section, a beveled tip including an end, and a head including an edge, said fitting defines a fitting length from said edge of said head to said end of said beveled tip.

10. The liquid fuel supply system in accordance with claim 9, wherein said purge gas port includes a port inlet and said purge gas channel defines a channel inlet, wherein said purge gas port defines an inlet length from said port inlet to said channel inlet.

11. The liquid fuel supply system in accordance with claim 10, wherein said end of said beveled tip and said purge gas inlet define a gap therebetween, and wherein said fitting length and said inlet length are sized such that said gap is less than or equal to a predetermined engineering tolerance.

12. The liquid fuel supply system in accordance with claim 11, wherein said purge gas port includes a threaded section and a beveled section defining a first bevel angle, and wherein said beveled tip defines a second bevel angle equal to said first bevel angle.

13. The liquid fuel supply system in accordance with claim 12, wherein said second bevel angle is equal to said first bevel angle plus or minus a threshold value.

14. The liquid fuel supply system in accordance with claim 12, wherein said first bevel angle is in a range of 30° to 40° and said second bevel angle is in a range of 30° to 40°.

15. The liquid fuel supply system in accordance with claim 12, wherein said housing further defines a purge gas chamber coupled in flow communication with said purge gas inlet, wherein said at least two drain ports are coupled in flow communication with said purge gas chamber and is are oriented to channel the liquid fuel out of said purge gas chamber when the purge gas is received through said purge gas inlet.

16. The liquid fuel supply system in accordance with claim 8, wherein said housing further defines:
a liquid fuel chamber coupled in flow communication with said liquid fuel inlet; and
an intermediate chamber coupled in flow communication with said liquid fuel chamber and a purge gas chamber;
wherein said at least one outlet is coupled in flow communication with said intermediate chamber, wherein the purge gas is channeled from said purge gas inlet into said purge gas chamber, said intermediate chamber, and said at least one outlet.

17. A method of selectively purging liquid fuel from a liquid fuel supply system, the liquid fuel supply system including a three-way valve and a fitting, said method comprising:
inserting the fitting into a purge gas inlet of the three-way valve, the three-way valve including a housing including a liquid fuel inlet, the purge gas inlet, at least two drain ports, and an outlet, wherein the purge gas inlet is in flow communication with a purge gas chamber;
channeling the liquid fuel into the liquid fuel inlet and through the housing of the three-way valve to the outlet;
stopping a flow of the liquid fuel through the three-way valve;
channeling purge gas from the fitting into the purge gas inlet and through the housing of the three-way valve to the outlet when the flow of the liquid fuel into the three-way valve is prevented; and
draining the liquid fuel from the purge gas chamber through the at least two drain ports, such that the liquid fuel is discharged from the three-way valve housing at a location that is spaced axially away from the outlet.

* * * * *